Patented Mar. 6, 1928.

1,661,301

UNITED STATES PATENT OFFICE.

JOHANNES PFLEGER, OF FRANKFORT-ON-THE-MAIN, AND AUGUST ALBERT, OF MUNICH, GERMANY.

PROCESS FOR THE MANUFACTURE OF NEW ORGANIC ARSENIC COMPOUNDS.

No Drawing. Original application filed November 29, 1924, Serial No. 752,947, and in Germany December 5, 1922. Divided and this application filed June 13, 1927. Serial No. 198,688.

This application is a divisional of our U. S. A application Ser. Nr. 752,947, filed November 29, 1924.

Derivatives of organic arsenic compounds have been prepared by causing hydrazine derivatives to react upon aliphatic cyclical arsenic compounds such as contain carbonyl groups in non-cyclical linkage, susceptible of reaction. Hereby condensation products are obtained which contain the arsenic in the same form of linkage and in the same degree of oxidation as the arsenic compound employed as originating substance. If, therefore, one starts for example from an arsenic acid, the condensation product with the hydrazine component is also an arsinic acid. If, on the other hand, one starts from an arsine oxide or from an arseno benzene, on condensation with hydrazine compounds the derivatives of the arsine oxide or the arseno benzene respectively are produced.

Furthermore, the above described process has been developed in the direction that the condensation products first obtained by condensation with hydrazine derivatives are then converted into such substances as contain the arsenic in a form of lower oxidation than the originating substance by treating them with suitable means of reduction such as, for example, hydrosulfite bisulfite and the like. For example, an arsinic acid may, therefore, be first condensed with a hydrazine compound and the substituted arsenic acid thus obtained may then be converted by reduction into the corresponding arsine oxide derivative or the arseno derivative respectively. In the same may a condensation product prepared by condensing hydrazine with an arsine oxide may be reduced into the corresponding arseno benzene.

According to our present invention new arsenic compounds of great therapeutical value are produced by reducing the condensation products of carbonyl arsenic compounds of the above mentioned character such as, for example, arsinic acid or arsine oxides, with nitrogen-hydrogen compounds containing reactive amino groups linked to carbon or oxygen and thus do not belong to the hydrazine series, the C=N double bond in the resulting compound not being destroyed by the reducing process.

As such reactive amino derivatives in the sense of our invention for instance bases of the type RNH$_2$ come into consideration. R may mean here any aliphatic or aromatic carbocyclical or heterocyclical or hydrogenated compound, either unsubstituted or substituted in some way; furthermore, for instance hydroxylamine and its derivatives, amino sulphonic acids, amino carboxylic acids, amino aldehydes and amino ketones, also for example acid amides, urea and its derivatives etc.

Condensation products of arsenic acids can, for example, be converted into the condensation products of the corresponding arsine oxide or arseno benzenes by treating them with suitable reducing agents, whereby, therefore, compounds with pentavalent arsenic are converted into such with trivalent arsenic. Also condensation products of arsine oxides may be converted into such of the corresponding arseno benzenes.

By way of illustrating the method as to how our invention should be carried out in practice we give the following examples:

(1) 1.8 grms. of the condensation product of p-acetophenone arsinic acid and p-aminoacetophenone are dissolved in 25 cc. of water and about 4 cc. of normal caustic soda solution under warming. 10 grms. of sodium hydrosulfite are added at about 65° C. whilst agitating thoroughly. A precipitate of the intensely yellow colored arseno benzene is formed. After stirring for half an hour at 60–70° C. the arseno benzene is filtered by suction and dried in vacuo. It remains unchanged when heated in a capillary tube up to 270° C.

(2) 1.8 grms. of the condensation product obtained from p-acetophenone arsinic acid and anthranilic acid are dissolved in 25 cc. of hot water with addition of 10 cc. of normal soda acetate solution. 14 grms. of sodium hydrosulfite are added at 60–70° C. under stirring without regard to undissolved particles. After half an hour the deposited yellow arseno benzene is filtered off by suction, washed and dried in vacuo. It remains unchanged when heated up to 270° C.

(3) 1.45 grms. of the condensation product obtained from p-amino acetophenone and urea are dissolved in 10 cc. of water with addition of as little normal caustic soda solution as possible. 10 grms. of sodium hydrosulfite are added to the solution at about 65° C. with agitation. After some time a yellow precipitate of the arseno benzene can be noticed. The reaction product is drawn off after stirring for one hour, washed and dried. It remains unchanged up to 280°.

(4) 0.82 grm. of the condensation product prepared by condensing p-benzaldehyde arsinic acid and amino antipurine is suspended in 24 cc. of water of about 60–70° C. 5.6 grms. of sodium hydrosulfite are added to the suspension whilst stirring well. The reduction is carried on for about half an hour at the temperature indicated. The arseno benzene formed is then aspirated. After drying in vacuo it fuses with decomposition at about 200° C.

(5) 0.8 grm. of the condensation product of 1-hydroxy-2-acetophenone-4-arsinic acid and p-phenetidine is moistened with 2 cc. of normal caustic soda solution. The sodium salt thus produced is then dissolved in 24 cc. of water. The solution is heated to 60–70° C. and reduced with 8 grms. of sodium hydrosulfite under stirring for about three quarters of an hour. The light yellow arseno benzene is filtered by suction, washed with water and dried in vacuo. It disappears gradually on being heated in a capillary tube to about 220° getting dark at the same time.

(6) p-acetophenone arsinic acid and o-amino benzaldehyde are condensed and 1.7 grms. of the condensation product are dissolved in 25 cc. of warm water with addition of the corresponding molecular weight of normal caustic soda solution. 7 grms. of hydrosulfite are added to the solution, the reduction being carried out at about 60–70° C. under stirring. After some time an additional 3 grms. of hydrosulfite may be added. After an hour the light yellow arseno benzene is aspirated, washed and dried. It decomposes at about 225° C. forming a glass-like light brown mass.

(7) 1.5 grms. of the condensation product of p-acetophenone arsinic acid and glycocol are dissolved in 20 cc. of water with addition of about 5 cc. of normal sodium acetate solution whilst heating gently. 10 grms. of sodium hydrosulfite are added to the sodlution under stirring. The reduction is complete after holding the temperature at 60–70° C. for about half an hour and the light yellow arseno benzene product is drawn off, washed and dried in vacuo. It grows dark on heating from 250° C. onward without melting.

(8) 0.8 grm. of the condensation product obtained from m-nitrobenzaldehyde arsinic acid and o-benzylhydroxylamine hydrochloride is suspended in 24 cc. of hot water. 5.6 grms. of sodium hydrosulfite are added at 60–70° C. under agitation. The yellow arseno benzene depositing as an oily mass is separated from the mother liquor after stirring for half an hour by decantation. It is washed with water, whereby it solidifies completely, and aspirated. It decomposes when heated at temperatures above 120 C.

(9) 0.3 grm. of the condensation product obtained from p-benzaldehyde arsine oxide and hydroxylamine hydrochloride, is finely pulverized and suspended in 10 cc. of water. About 1.0 grm. of hydrosulfite is added to the suspension which must be as fine as possible, at ordinary temperature. The conversion into arseno benzene proceeds at once. The reaction mixture is shaken frequently and vigorously and is kept at room temperature for some time. It is then aspirated, washed and dried. The arseno benzene does not fuse at 280° C.

What we claim is:

1. A process for the manufacture of new organic arsenic compounds which consists in reducing the condensation product of an organic arsenic compound containing carbonyl groups in non cyclical linkage with an nitrogen hydrogen compound containing the grouping NH₂—a—wherein a is carbon or oxygen and the amino hydrogens are reactive with carbonyl groups, the C=N bond in the resulting condensation product not being destroyed by the reducing process.

2. A process for the manufacture of new organic arsenic compounds which consists in reducing by means of hydrosulfite the condensation product of an organic arsenic compound containing carbonyl groups in non-cyclical linkage with a nitrogen hydrogen compound containing the grouping NH₂—a—wherein a is carbon or oxygen and the amino hydrogens are reactive with carbonyl groups, the C=N bond in the resulting condensation product not being destroyed by the reducing process.

3. A process for the manufacture of new organic arsenic compounds which consists in reducing the condensation product of an organic arsenic compound of the general formula

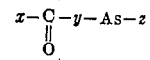

wherein x stands for hydrogen or any hydrocarbon residue.

y for an aryl substituted or not.

As for the arsenic atom in its trivalent or pentavalent state.

z for oxygen or the ≡ O (OH)₂ group with a nitrogen hydrogen compound containing the grouping NH₂—a—wherein a is carbon or oxygen and the amino hydrogens are reactive with carbonyl groups, the C=N bond in the resulting condensation product not being destroyed by the reducing process.

4. A process for the manufacture of new organic arsenic compounds which consists in reducing by means of hydrosulfite the condensation product of an organic arsenic compound of the general formula

wherein
*x* stands for hydrogen or any hydrocarbon residue.
*y* for an aryl, substituted or not.
As for the arsenic atom in its trivalent or pentavalent state.
*z* for oxygen or the ≡O (OH)$_2$ group with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

5. A process for the manufacture of new organic arsenic compounds which consists in reducing the condensation product of an organic arsenic compound of the general formula

wherein
*x* stands for hydrogen or any hydrocarbon residue.
*y* for an aryl, substituted or not with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

6. A process for the manufacture of new organic arsenic compounds which consists in reducing by means of hydrosulfite the condensation product of an organic arsenic compound of the general formula

wherein
*x* stands for hydrogen or any hydrocarbon residue.
*y* for an aryl, substituted or not with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

7. A process for the manufacture of new organic arsenic compounds which consists in reducing the condensation product of para-acetophenone-arsinic-acid of the following formula

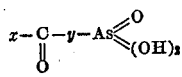

with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

8. A process for the manufacture of new organic arsenic compounds which consists in reducing by means of hydrosulfite the condensation product of para-aceto-phenone-arsinic-acid of the following formula

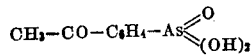

with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

9. As new products compounds which are substantially identical with the organic arsenic compounds obtainable by reducing the condensation product of an organic arsenic compound of the general formula

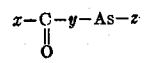

wherein
*x* stands for hydrogen or any hydrocarbon residue.
*y* for an aryl, substituted or not.
As for the arsenic atom in its trivalent or pentavalent state.
*z* for oxygen or the ≡O (OH)$_2$ group with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

10. As new products compounds which are substantially identical with the organic arsenic compounds obtainable by reducing the condensation product of para-benzaldehyde arsinic acid of the following formula

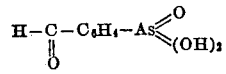

with a nitrogen hydrogen compound containing the grouping NH$_2$—*a*—wherein *a* is carbon or oxygen and the amino hydrogens are reactive with carbonyl groups, the C=N bond in the resulting condensation product not being destroyed by the reducing process.

11. As new products compounds which are substantially identical with the organic arsenic compound obtainable by reducing the condensation product of para-benzaldehyde arsinic acid of the following formula

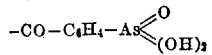

with amino antipyrine, the C=N double bond not being destroyed by the reducing process.

In testimony whereof we affix our signatures.

JOHANNES PFLEGER.
AUGUST ALBERT.